May 31, 1966  F. F. WHITTLE  3,254,255
MERCURY VAPOR DISCHARGE DEVICE HAVING A NOVEL BRAZING ALLOY
Filed Jan. 4, 1963

WITNESSES:

INVENTOR
Francis F. Whittle
BY
ATTORNEY 3,254,255
MERCURY VAPOR DISCHARGE DEVICE HAVING
A NOVEL BRAZING ALLOY
Francis F. Whittle, Elmira, N.Y., assignor to Westinghouse Electric Corporation, Pittsburgh, Pa., a corporation of Pennsylvania
Filed Jan. 4, 1963, Ser. No. 249,501
3 Claims. (Cl. 313—171)

The present invention relates to brazing alloys for use in uniting members exposed to mercury vapor in devices, such as, electrical mercury vapor discharge devices, ignitrons and switches.

Heretofore, in the production of electrical devices containing mercury in some form such as ignitrons, the various components of the device were hermetically joined to provide a vacuum tight seal for the device. Some of the joints involved metals and ceramics and required a brazing alloy therefor. Since the brazed alloy joints were within the electrical devices, they were subjected to either mercury or mercury vapors. It was discovered that after extended use of the electrical devices, many of the brazing alloys employed within the ignitron tubes to provide joints therein reacted or amalgamated with the mercury or mercury plasma thereby causing an actual leak in the tube or by contaminating the mercury so that the tube becomes inoperative.

The object of the present invention is to provide a brazing alloy which will not amalgamate or react with mercury.

Another object of the invention is to provide an electrical device containing mercury wherein members to be joined in the electrical device are exposed to the mercury and are united together by a brazing alloy comprising by weight from 0.3 to 6% chromium and the balance being copper.

A further object of the invention is to provide a seal between a metal member and a ceramic member consisting of an alloy comprising by weight from 0.3% to 6% chromium and the balance being copper.

A still further object of the invention is to provide a process for forming a mercury resistant brazed joint between at least two members by melting an alloy comprising by weight from 0.3 to 6% chromium and the balance copper, in a dry reducing atmosphere so that the alloy flows over the members to be joined, introducing water vapor into the atmosphere while the alloy is molten and cooling to solidify the alloy and provide green chromium oxide on the surfaces of the joint.

Other objects of the invention will in part be obvious, and will in part, appear hereinafter.

Figure 1:
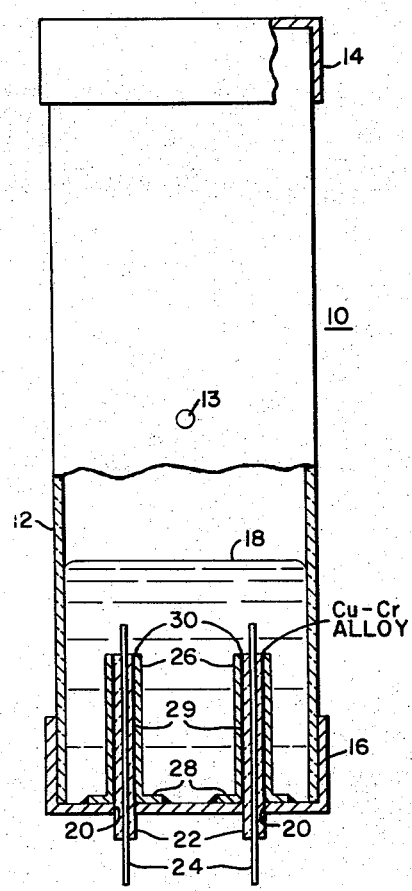
Figure 2:
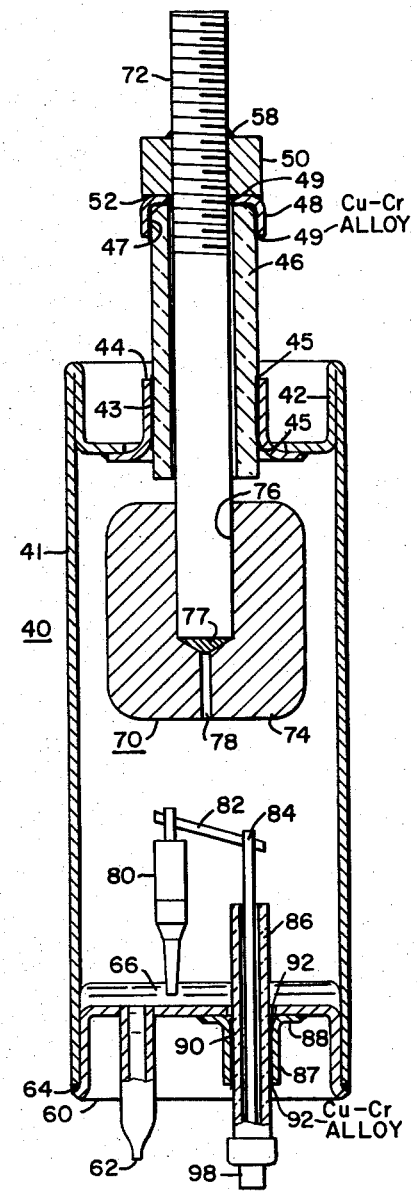

For a better understanding of the nature and objects of the invention, reference should be had to the following detailed description and drawings, in which:

FIGURE 1 is an elevation view partly in cross-section of a mercury switching device embodying the present invention; and FIG. 2 is an elevation view partly in section of an electric discharge device embodying the present invention.

In accordance with the present invention and in attainment of the foregoing objects there is provided an electrical device containing mercury wherein a seal is provided between members to be joined within the device, especially metal and ceramic members, which are exposed to the mercury, the members being united together by a brazing alloy comprising by weight from 0.3 to 6% chromium and the balance being copper, the resultant seal being resistant to mercury.

In a specific embodiment of the invention it is preferred that the brazing alloy comprises by weight from 0.4 to 1.2% chromium and the balance copper. The chromium content should not be less than about 0.3% since, after melting the brazing alloy and forming the oxide of chromium on the brazing surface, the resultant coating may be too sparse to prevent mercury from alloying with the copper content of the alloy. On the other hand, chromium contents greater than 1.2% chromium cause the melting temperature of the brazing alloy to rise rapidly. Therefore, if the composition contains more chromium, higher brazing temperatures are required resulting in increased costs and possible damage to the electrical devices in which the brazing alloys are employed. Very good results have been obtained with an alloy containing from .4 to 1.2% chromium, the remainder being copper and especially with an alloy consisting of 0.6% chromium and 99.4% copper.

A mercury resistant brazed joint may be formed between a ceramic member and a metal member or between two metal members by a novel method comprising preparing an alloy preform, of the desired proportions of copper and chromium. The preformed alloy is then disposed between the members to be joined and the assembly is placed in a suitable fixture to hold the components in situ. A wire preform is desirable since it can easily be wrapped around one of the members to be joined. The assembly is then disposed in a furnace having a dry reducing atmosphere, such as, dry hydrogen, and is subjected to a temperature of about 1200° C. sufficient to melt the alloy so that the alloy flows over the members to be joined. It is essential to the invention that the atmosphere be initially dry (i.e.—70 dew point) and reducing so that the members do not initially oxidize and cause joint failure. While the alloy is in the molten state, water vapor is introduced into the atmosphere and the alloy is immediately cooled to cause solidification and to enable the formation of green chromium oxide on the surfaces of the joint.

The alloy of the invention may be employed to join ceramic members, ceramic members to metal members and metal members. The ceramic members joined by the alloy may comprise any good ceramic material, for example, high alumina porcelains, steatites or cordierites. It is preferred, in order to ensure a strong and uniform joint, that the ceramic member be metallized and/or plated with a metal at the surfaces to be joined. The metal members to be joined by the process of the invention may comprise any mercury resistant metal having a greater melting temperature than that of the brazing alloy.

Referring to FIG. 1 there is shown an illustration of one embodiment of the present invention. A mercury type switching device 10 comprises a hollow cylindrical member 12 consisting of a glass or ceramic material. The cylindrical member 12 is capped at each end thereof by means of metal headers 14 and 16. The metal headers 14 and 16 may be joined to the non-metallic cylindrical member 12 by any method known to those skilled in the art. The member 12 contains a centrally located means 13 for pivoting the said member. The hollow cylinder 12 also contains a movable pool of mercury 18 therewithin. The header member 16 contains two apertures 20 capable of receiving ceramic insulating members 22 each having an electrical lead 24 sealed therein. The ceramic insulating members 22 are disposed within and joined to a metal ring member 26 having a peripheral flange 28 by means of the brazing alloy 29 of the invention. Layers 30 of green chromium oxide are formed on the surface of the alloy 29 during the furnace brazing operation. The peripheral flange 28 is then welded to the inner surface of the header 16 to provide a vacuum type seal.

When the mercury pool 18 is in the position indicated in the figure, the brazing alloy 29 is in continuous contact therewith. However, owing to the mercury resistant characteristics of the brazing alloy of the invention, particularly the layers 30 of green chromium oxide, the mercury will neither amalgamate nor react therewith.

With reference to FIG. 2 there is shown another embodiment of the present invention. A discharge device 40 of the ignitron type contains a shell portion 41 which comprises a suitable material such as stainless steel. The shell 41 is of a substantially cylindrical shape and is provided, at its upper end, with an inner peripheral flange 42. A flanged ring member 44 of a suitable metal, such as, an iron, nickel cobalt alloy selling under the trade name Kovar is disposed at the top of the shell 41 and is secured thereto by suitable means, such as, by seam welding it to the inner periphery of the flange 42. An insulating support member 46 comprising a material, such as, an alumina ceramic is disposed within member 44 and is joined thereto by the brazing alloy 43 of the invention. Layers 45 of green chromium oxide are present on the alloy 43. A cap member 48, which preferably comprises a Kovar alloy is secured and joined to the outer periphery of the support member 46 by means of brazing alloy 47 of the invention. Layers 49 of green chromium oxide are present on the alloy 47. The member 48 is substantially cup shaped and is provided with a centrally disposed aperture in the base thereof. An internally threaded member 50 is disposed on the cap 48. The member 50 is preferably welded at 52 to the cap member 48 and this weld may then be brazed with copper to ensure a vacuum joint at the jointure of these two members. The ring member 44, insulating support member 46, cap 48 and member 50 collectively form a support structure for an anode assembly indicated generally at 70. The anode assembly 70 is comprised primarily of a lead member 72 and an anode block 74 and will be discussed in greater detail subsequently.

The upper portion of the lead 72 is provided with external screw threads which correspond to the internal threads in the member 50. Thus, the anode assembly 70 is supported within the device 40 in a manner to provide that the anode block 74 is supported within the shell portion 41 by screwing the lead 72 through the member 50 an amount to properly space the anode block 74 in its proper position within the shell 41. Once the anode assembly 70 has been properly positioned a solder joint 58 is provided at the jointure between the top of the member 50 and the lead 72 in order to provide a vacuum seal at this joint.

The bottom portion of the shell 41 is closed off by a header 60 which is provided with a suitable tipped-off exhaust tabulation 62. The header 60 may be comprised of the same material as that of the shell 41 and may be secured thereto by a peripheral seam weld 64.

A cathode 66, which comprises a pool of mercury is disposed within the lower portion of the shell 41 in a manner well known in the art.

Also disposed within a lower portion of the device is a pointed make-alive or igniting device 80 having a tapered point which is inserted into the mercury pool cathode 66 in a suitable manner. The igniting device 80 is of a high resistance material such as, boron carbide and is supported by an arm 82 which in turn is supported by a rod 84 passing through the header 60 and is insulated from the header 60 and mercury pool cathode 66 by an insulating ceramic cylinder 86. The ceramic cylinder 86 is disposed within and joined to a metallic ring member 87 having an outer peripheral flange 88. The ceramic cylinder is joined to the inner periphery of the ring 87 by means of the brazing alloy 90 of the present invention. Layers 92 of green chromium oxide are present on the alloy 90. The flange 88 is welded to the outer surface of the header 60. The jointure of the cylinder 86 to the flange 88 is preferably made as a subassembly. The subassembly is then welded to the header 60 at the flange 88 of the ring 87 before the header is spot welded to the bottom of the shell 41. A suitable terminal block 98 is provided at the lower end of the rod 84 in order to provide the igniting device 80 with a proper source of electrical potential.

With specific reference to the anode assembly 70, the assembly consists primarily of the electrical lead and support 72 and the anode itself which is in the shape of a block 74. The lead 72 may be made of a low alloy content steel, or of any electrically conductive material which, preferably, is not readily amalgamable with mercury vapor. As has been stated, the anode 74 may be comprised of a metal, for example, molybdenum or steel or a non-metal, such as, graphite. The anode 74 is provided with a longitudinally extending bore 76. Where the anode 74 comprises a metal, a quantity of brazing material 77 is disposed within the bottom portion of the bore, which material 77, is of such nature, so as to be compatible, in a brazing sense, with both the metal of the anode 74 and that of the lead 72.

The non-threaded end of the lead 72 is disposed within the bore 76 of the block 74 and these elements are then heated to the brazing temperature to ensure both a good mechanical and electrical connection between these members. If desired, a second bore 78 of relatively small diameter may be provided communicating the bore 76 with the exterior of the anode block 74 in order to preclude the entrapment of gas within the bore 76.

If the anode block 74 consists of a non-metal, the bore 76 may be threaded and the lead 72 may be threaded so that the block 74 may be threadedly engaged to the lead 72. The anode assembly 70 is preferably made as a subassembly and inserted through the member 50 prior to the enclosure of the lower end of the shell 41 with the header 60.

It is thus apparent from the arrangement shown in FIG. 2 that the brazing alloys 43 and 90 joining cylindrical members 46 and 86 to metal members 44 and 87 is continuously subject to mercury attack. However, owing to its mercury resistance characteristics, particularly the chromium oxide layers 45 and 92, the brazing alloys 43 and 90 will not amalgamate or react with the mercury.

The following example is illustrative of the teachings of the invention.

A plurality of cylindrical insulating members comprising alumina were joined to flanged ring members by metallizing the outer periphery of the ceramic member with molybdenum-manganese at the surfaces to be joined and subsequently nickel plating the metallized area. An alloy wire preform member consisting of 0.6% chromium and 99.4% copper was wrapped around the plated area of the cylindrical member. The flanged ring members were then disposed on the ceramic members closely adjacent the alloy wire preform. The ring members consisted of Kovar alloy. The assemblies were then placed in suitable jigs and were disposed in a furnace containing an atmosphere of hydrogen having a dew point of −70. The assemblies were heated at a temperature of about 1200° C. so that the alloy flowed between the ceramic members and the ring members. Water vapor was then introduced into the atmosphere while the alloy was still molten. The assemblies were then immediately cooled to solidify the alloy and to provide green chromium oxide on the surfaces of the joint caused by the introduction of the water vapor into the atmosphere.

The assemblies were then removed from the jigs and were employed where necessary in an ignitron as is shown in FIG. 2. A number of these ignitrons were produced and tested. An examination of the brazed joint between the ceramic cylindrical member and the flanged ring member indicated that there was no mercury attack on the brazed joint.

It will be obvious to those skilled in the art that the alloy of the invention has many other uses where it is desired to join a metal member to a ceramic member by a brazing material which is unaffected by mercury as in various types of electric apparatus, such as, mercury thyratrons and mercury rectifiers.

It is intended that the foregoing description and drawings be interpreted as illustrative and not limiting.

I claim as my invention:

1. An evacuated mercury switch comprising a closed non-metallic cylindrical member partly filled with mercury, a contact arrangement comprising electrically conductive metal members extending through and being sealed to the cylindrical member by a brazing alloy consisting essentially of by weight from about 0.4 to 1.2% chromium and the balance copper, said seal having all exposed surfaces covered with a coating of chromium oxide of sufficient thickness to impart a green color to the coating and said seal being resistant to and non-amalgamable with mercury.

2. An electric discharge device of the vapor type comprising an evacuable envelope, a metal header disposed at one end of the envelope, a mercury pool-type cathode disposed on the header, an anode disposed at the other end of the envelope within said envelope, lead means for securing to and supporting said anode within the envelope and for electrically connecting said anode to the exterior of said envelope, igniting means disposed in said mercury pool, and support means for said igniting means, said support means extending through the header and being electrically insulated therefrom by a ceramic member, the ceramic member being affixed to a flanged metal ring member by a braze joint consisting essentially of a brazing alloy consisting essentially of by weight from about 0.4 to 1.2% chromium and the balance copper, a coating of chromium oxide, of sufficient thickness to impart a green color to said coating, on all exposed surfaces of said braze joint, the flange of the flanged metal ring member being welded to the header to provide a hermetic seal, the resulting braze joint being resistant to and non-amalgamable with mercury.

3. An ignitron comprising an evacuable envelope, a header consisting of a mercury resistant metal disposed at one end of the envelope, a mercury pool cathode disposed on the header, an anode comprised of a substantially cylindrical shaped block of material having a bore extending thereinto disposed in the envelope, lead means for supporting said block within the envelope and for electrically connecting said anode to the exterior of the envelope, insulating means disposed about said lead means, said lead and insulating means extending through the envelope, said lead means having one end thereof disposed within said bore and secured therein to said block, said insulating means being disposed within and affixed to a first flanged metal ring member by a first braze joint consisting essentially of a brazing alloy consisting essentially of about 0.6% chromium and 99.4% copper, a coating of chromium oxide, of sufficient thickness to impart a green color to said coating, on all exposed surfaces of said first braze joint, the flange of said first flanged metal ring member being welded to the envelope to provide a hermetic seal, igniting means disposed in said mercury pool, and support means for said igniting means, said support means extending through the header and being electrically insulated therefrom by a ceramic member, the ceramic member being affixed to a second flanged metal ring member by a second braze joint consisting essentially of a brazing alloy consisting essentially of by weight about 0.6% chromium and 99.4% copper, a coating of chromium oxide, of sufficient thickness to impart a green color to said coating, on all exposed surfaces of said second braze joint, the flange of said second flanged metal ring member being welded to the header to provide a hermetic seal, said first and said second braze joints being resistant to and non-amalgamable with mercury.

References Cited by the Examiner

UNITED STATES PATENTS

| 1,706,154 | 3/1929 | Gillette | 75—154 |
| 1,988,422 | 1/1935 | Miller | 75—154 |
| 2,201,555 | 5/1940 | Corson | 75—153 X |
| 2,206,710 | 7/1940 | Tonks | 313—171 |
| 2,362,007 | 11/1944 | Larsen et al. | 75—153 X |
| 2,437,146 | 3/1948 | Zuzers | 313—171 |
| 2,515,191 | 7/1950 | Carpenter | 29—498.5 |
| 2,749,483 | 6/1956 | Rigrod | 313—171 |
| 2,795,501 | 6/1957 | Kelly | 75—153 |
| 2,886,732 | 5/1959 | Knight | 313—171 |
| 2,919,367 | 12/1959 | Hernqvist | 313—171 |
| 3,012,903 | 12/1961 | Cape | 29—498.5 |
| 3,073,983 | 1/1963 | Custer | 313—171 |

OTHER REFERENCES

Donaldson: Copper and Its Alloys, Metal Industry, May 12, 1944.

GEORGE N. WESTBY, *Primary Examiner.*

D. E. SRAGOW, K. L. CROSSON, *Assistant Examiners.*

ARTHUR GAUSS, *Examiner.*